(12) United States Patent
Hill

(10) Patent No.: US 10,000,907 B2
(45) Date of Patent: Jun. 19, 2018

(54) LIFT ARM VEHICLE WINDOW

(71) Applicant: Wacker Neuson Production Americas L.L.C., Menomonee Falls, WI (US)

(72) Inventor: Aaron Hill, Germantown, WI (US)

(73) Assignee: Wacker Neuson Production Americas, L.L.C., Menomonee Falls, WI (US)

( * ) Notice: Subject to any disclaimer, the term of this patent is extended or adjusted under 35 U.S.C. 154(b) by 109 days.

(21) Appl. No.: 14/933,236

(22) Filed: Nov. 5, 2015

(65) Prior Publication Data
US 2017/0130516 A1 May 11, 2017

(51) Int. Cl.
| | |
|---|---|
| *E06B 3/46* | (2006.01) |
| *E06B 9/02* | (2006.01) |
| *E02F 9/16* | (2006.01) |
| *B60K 28/10* | (2006.01) |
| *E02F 3/34* | (2006.01) |
| *E02F 9/20* | (2006.01) |
| *E02F 9/26* | (2006.01) |
| *E06B 9/00* | (2006.01) |

(52) U.S. Cl.
CPC ............... *E02F 9/16* (2013.01); *B60K 28/10* (2013.01); *E02F 3/3414* (2013.01); *E02F 9/163* (2013.01); *E02F 9/2033* (2013.01); *E02F 9/268* (2013.01); *E06B 9/02* (2013.01); *E06B 2009/002* (2013.01)

(58) Field of Classification Search
CPC ........ E06B 9/02; E06B 9/04; E06B 2009/002; E02F 9/163
USPC ........ 701/50; 296/155, 146.1, 190.1, 146.16, 296/190.08; 49/348–349, 360, 506, 50, 49/55, 323–324; 374/208
See application file for complete search history.

(56) References Cited

U.S. PATENT DOCUMENTS

| | | | | |
|---|---|---|---|---|
| 4,564,410 A * | 1/1986 | Clitheros | ............... | B05C 5/0216 118/323 |
| 5,640,167 A * | 6/1997 | Hall | ................... | H01Q 1/1271 343/704 |
| 5,802,766 A * | 9/1998 | Miyazaki | ................... | B60J 1/04 49/28 |
| 5,936,585 A * | 8/1999 | Hall | ................... | H01Q 1/1278 343/713 |
| 7,971,677 B2 | 7/2011 | Ekren et al. | | |
| 8,091,955 B2 | 1/2012 | Hill et al. | | |
| 9,469,081 B2 * | 10/2016 | Hill | ............... | B41J 3/407 |
| 2001/0008346 A1* | 7/2001 | Martin, Jr. | ................ | B60J 1/02 296/190.08 |
| 2004/0139657 A1* | 7/2004 | Fukumoto | ............... | B60J 5/0416 49/350 |
| 2004/0232030 A1* | 11/2004 | Koseki | ................ | B65D 43/162 206/497 |

(Continued)

OTHER PUBLICATIONS

The transparent cockpit; Susumu Tachi; Masahiko Inami; Yuji Uema; IEEE Spectrum; Year: 2014, vol. 51, Issue: 11 pp. 52-56, DOI: 10.1109/MSPEC.2014.6934935.*

(Continued)

*Primary Examiner* — Cuong H Nguyen
(74) *Attorney, Agent, or Firm* — Shane Delsman; Godfrey & Kahn, S.C.

(57) ABSTRACT

A window assembly that can be opened and closed includes a transparent grid to prevent an operator from extending an arm through the opened window and into the path of a lift arm without impairing the vision of the operator. The window assembly may include more than one openable panes and/or one or more transparent stationary panes. The window may also include a sensor to sense if the window is compromised and may cause the lift arm vehicle to take a safety action if a compromise is detected.

28 Claims, 8 Drawing Sheets

(56) References Cited

U.S. PATENT DOCUMENTS

| | | | | |
|---|---|---|---|---|
| 2005/0046230 | A1* | 3/2005 | Fukumoto | B60J 5/0416 296/155 |
| 2010/0264695 | A1* | 10/2010 | Hill | B60J 1/00 296/190.11 |
| 2010/0265048 | A1* | 10/2010 | Lu | B60Q 9/005 340/435 |
| 2014/0141197 | A1* | 5/2014 | Hill | B41J 3/407 428/137 |

OTHER PUBLICATIONS

Vehicular Transparent Surfaces' Patterned Film for Onboard Pico Projection Applications; Wallen Mphepo; Journal of Display Technology; Year: 2011, vol. 7, Issue: 7; pp. 391-397, DOI: 10.1109/JDT.2011.2113370.*

Transparent Cockpit: Visual Assistance System for Vehicle Using Retro-reflective Projection Technology; Takumi Yoshida; Kensei Jo; Kouta Minamizawa; Hideaki Nii; Naoki Kawakami; Susumu Tachi; 2008 IEEE Virtual Reality Conference; Year: 2008 pp. 185-188, DOI: 10.1109/VR.2008.4480771.*

Smart windows switch on the light; C. M. Lampert; IEEE Circuits and Devices Magazine; Year: 1992, vol. 8, Issue: 2 pp. 19-26, DOI: 10.1109/101.127309.*

Model predictive control of integrated room automation considering occupants preference; Sareh Agheb; Xiaoqi Tan; Danny H. K. Tsang2015 IEEE International Conference on Smart Grid Communications (SmartGridComm)Year: 2015, pp. 665-670. (Year: 2015).*

Website screenshots of http://web.archive.org/web/20120331000407/http://www.miniatureconstructionworld.co.uk/jcb330.html; Miniature Construction World; Mar. 31, 2012.

* cited by examiner

LIFT ARM VEHICLE WINDOW

FIELD OF THE INVENTION

This invention relates generally to windows. More particularly, the present invention relates to windows for construction vehicles with lift arms.

BACKGROUND

There are industrial vehicles which utilize arms to perform various tasks. For example, a skid steer loader or compact track loader utilizes an arm on each side of an enclosure in which a user sits, or cab, to raise and lower a work implement, e.g. a bucket. By way of another example, an excavator, telehandler and mobile crane utilize a single arm on one side of a cab to raise and lower a work implement. Other industries also use vehicles with one or more lift arms and a cab such as delimbers, feller bunchers, and harvesters.

Because the lift arms function, e.g. raise and lower, on one or both sides of the cab, certain safety standards and/or industry practices require that the cab be guarded and/or enclosed on the side(s) adjacent the lift arm(s) to prevent the user or operator in the cab from extending an arm, or any other body part, into the path of the lift arm(s) and causing bodily harm to the operator. Safety standards and/or industry practices also require that such an enclosure be able to withstand certain forces, e.g. impact resistance.

Currently, such construction vehicles enclose the cab in one of two ways. Some such construction vehicles enclose the side(s) of the cab adjacent the arm(s) with a cage. Cages are typically made from metal, e.g. steel. Some cages are made from a series of metal materials, such as dowels or bars, connected together to form a grid or lattice, while others are punched from a larger sheet of material. In either case, the openings of the cage are properly sized to prevent an operator from putting an extremity through, into the path of a lift arm.

Cages have a number of advantages, including being lower cost and allowing ventilation of the cab and an operator of the vehicle to communicate with people outside of the vehicle and vice versa. However, cages also have a number of disadvantages including impairing vision, allowing dust and debris to enter the cab and exposing the operator to the elements, e.g. during extreme cold or warm temperatures. These disadvantages can affect the operator's performance and safety.

Other such construction vehicles enclose the side(s) of the cab adjacent the arm(s) with a solid clear sheet of material, such as glass or polymers including polycarbonate or acrylic, that encloses the entire side(s) adjacent the arm(s). The material is durable and strong enough to prohibit breakage in extreme conditions. Use of a solid clear sheet of material, such as polycarbonate, has a number of advantages that are largely the disadvantages of a cage. However, using a solid clear sheet of material also has many disadvantages including being more costly, impeding the ability for an operator to communicate with people outside of the vehicle and vice versa, and preventing ventilation. These disadvantages can also affect the operator's performance and safety.

Some construction vehicles have attempted to combine a cage with an operable window. Examples are discussed in U.S. Pat. No. 8,091,955 and published European Patent Application Number 1,066,998. Such combinations do gain the benefits from being able to open and close a window, but suffer from being more costly, having both a cage and window structure, while still impairing the vision of the operator. Cleaning the exterior of the window, between the window and the cage can also be difficult and time consuming.

As such, there is a need for a cost effective cab enclosure that is able to withstand certain forces acting on it, can be selectively opened and closed and prevents an operator from being able to put his or her self in the path of the lift arm(s) all while not impairing the vision of the operator.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

The window(s) or window assembly(ies), as shown in FIGS. 1-8, is able to withstand certain forces acting on it, can be selectively opened and closed and prevents an operator from being able to put him or herself in the path of the lift arm(s) without impairing his or her vision.

Figure 1:
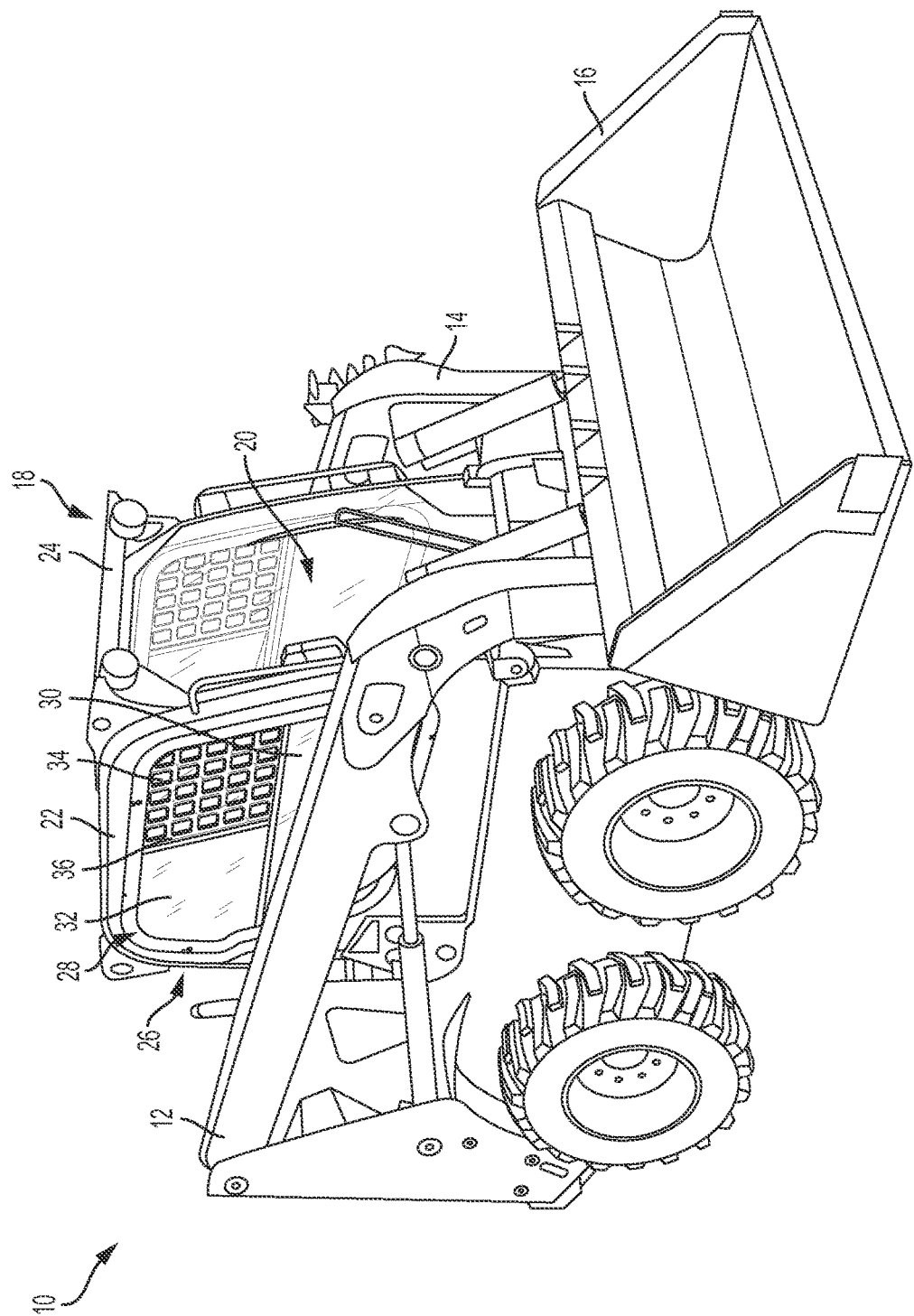
FIG. 1 is a side perspective view of a skid steer having at least one window.
Figure 2:
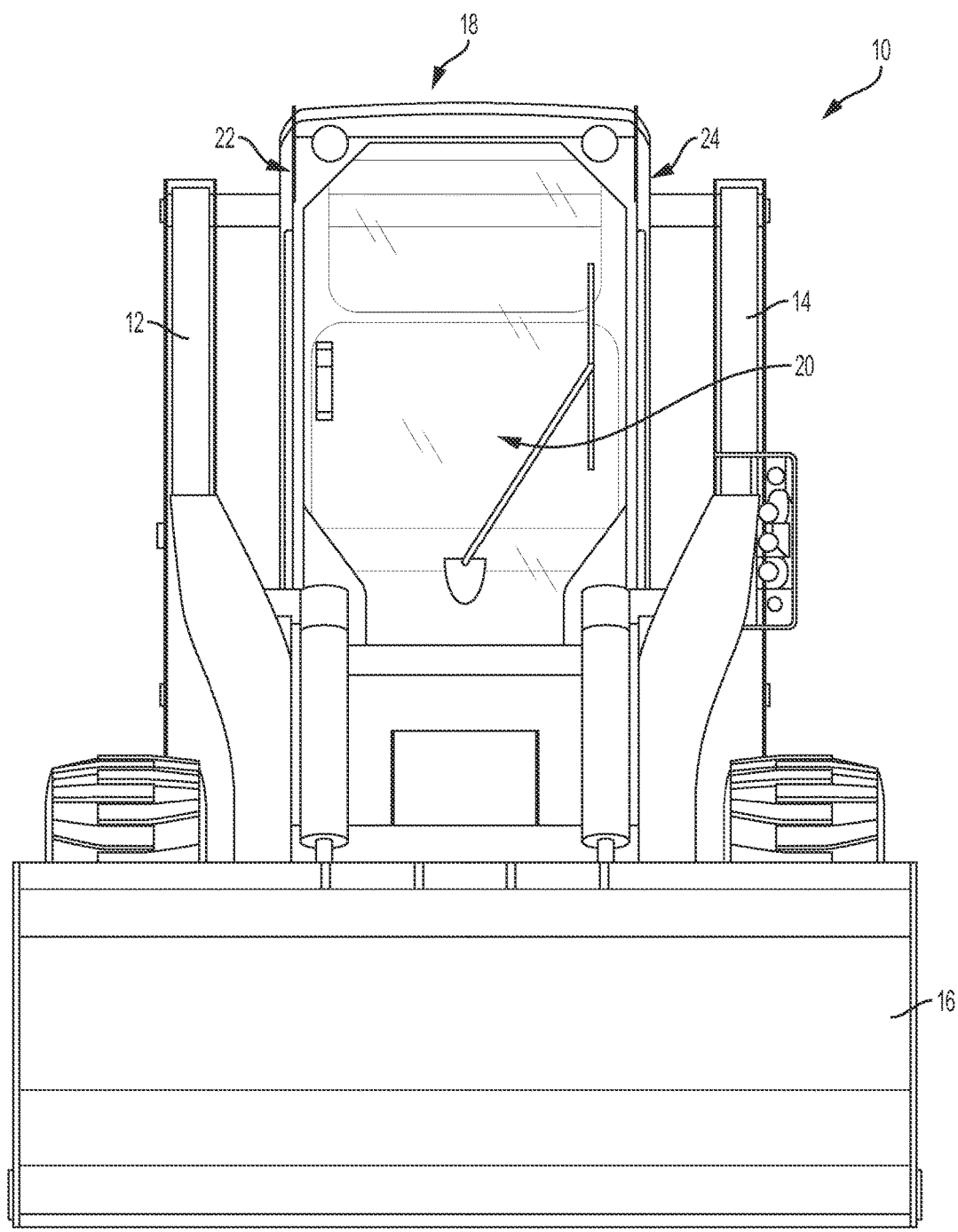
FIG. 2 is a front elevation view of the skid steer of FIG. 1.

The skid steer loader 10 shown in FIG. 1 includes a pair of lift arms 12, 14 that operate to work an implement 16, in the example shown a bucket. The enclosure for the operator or cab 18 has an entrance 20, in this case a door, through which the operator may enter and exit the cab, two side walls or panels 22, 24 and a rear panel 26. As can be seen most clearly in FIG. 2, there is very little clearance between the lift arms 12, 14 and the side panels 22, 24. Therefore, it is important that the operator be prevented from being able to put him or herself in the way of the lift arms.

Figure 3:
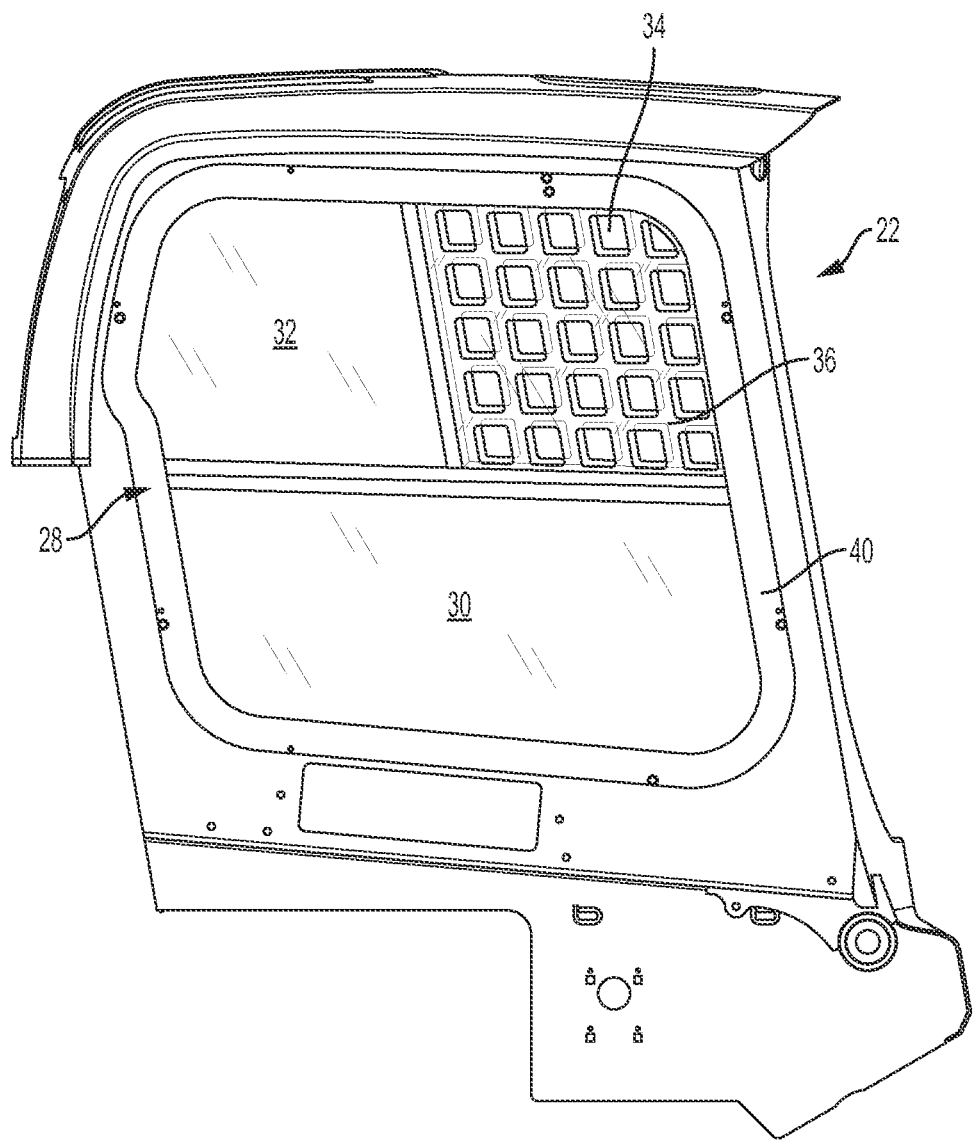
FIG. 3 is a side elevation view of the side wall and window of FIG. 1 in a closed position.
Figure 5:
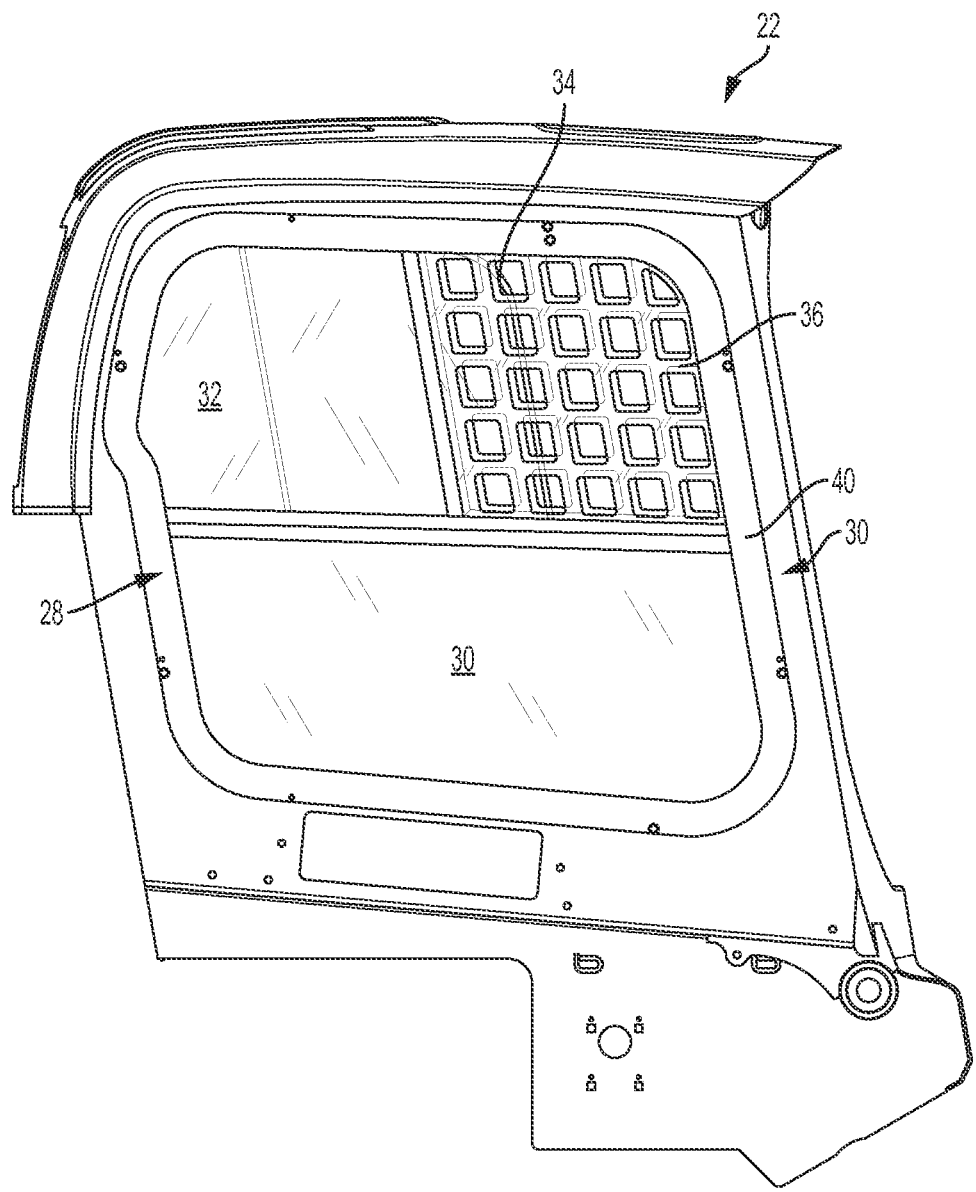
FIG. 5 is a side elevation view of the side wall and window of FIG. 3 with one pane in a partially opened position.

In FIG. 3, a side panel 22 of the cab 18 is shown. The side panel 22 includes a three piece window 28 attached thereto. The three piece window 28 includes a transparent, clear or see-through bottom pane 30, a transparent, clear or see-through upper left pane 32 and a transparent, clear or see-through upper right pane 34. In the example window shown in FIG. 3, the bottom 30 and upper left panes 32 are stationary, but the upper right pane 34 can be slid back behind the upper left pane 32. In FIG. 5, the upper right pane 34 is shown partially opened and slid partially back behind the upper left pane 32.

In front of the upper right pane 34, when the upper right pane is closed, is a transparent screen, grid or lattice 36. The transparent screen 36 is made from a clear, transparent or see-through material that forms a grid or lattice and open space or voids such that the interior of the cab 18 is exposed to the exterior of the cab.

Without the transparent screen 36, the window 28 would have an opening or hole 38 that the operator could extend a hand through and into the path of a lift arm 12, when the upper right pane 34 is open or slid back as shown in FIG. 5. The transparent screen 36 is used to prevent the operator from putting him or herself in the path of the lift arm when the window is open.

The transparent screen 36 could be sized to fit in the opening, such as by being attached to a frame 40, by being integrally formed with either or both of the bottom pane 30 and upper left pane 32 or any other method for attaching a screen to cover the opening.

The upper right pane 34 is movable to and from a first position in which the upper right pane covers and blocks or seals the transparent screen 36 to prevent the interior of the cab or first side of the transparent screen from being in fluid communication with the exterior of the cab or second side of the transparent screen. In the first position, the window is "closed." This first position may be preferred when it is cold outside, to prevent debris or exhaust from entering the cab or if it desired to pressurize the cab.

The upper right pane 34 is also movable to and from a second position in which the upper right pane uncovers or exposes at least a part of the transparent screen 36 to allow the interior of the cab to be in fluid communication with the exterior of the cab through the openings in the transparent screen. In the second position, the window is "open." This second position may be preferred when it is desired to ventilate the cab or to communicate with someone outside the cab. When the window is open, the operator cannot put him or herself in the way of the lift arm(s) 12, 14 and the transparent screen 36 provides the requisite and/or desired resistance to impacts. Further, regardless of whether the window 28 is open or closed, the visibility of the operator through the window remains high because the screen 36 is transparent.

The transparent screen can be made from any clear or transparent material that can withstand the forces required by certain safety standards and/or industry practices. For example, the transparent screen 36 can be made from a transparent polymer, such as an injection molded polycarbonate material and the panes 30, 32, 34 made from a glass, such as automotive laminated safety glass, although other materials such as acrylic, acrylonitrile butadiene styrene, polyethylenimine, polypropylene, thermoplastic polyurethane, cellophane, toughed glass or tempered glass, may be used without departing from the spirit of the invention.

Figure 4:
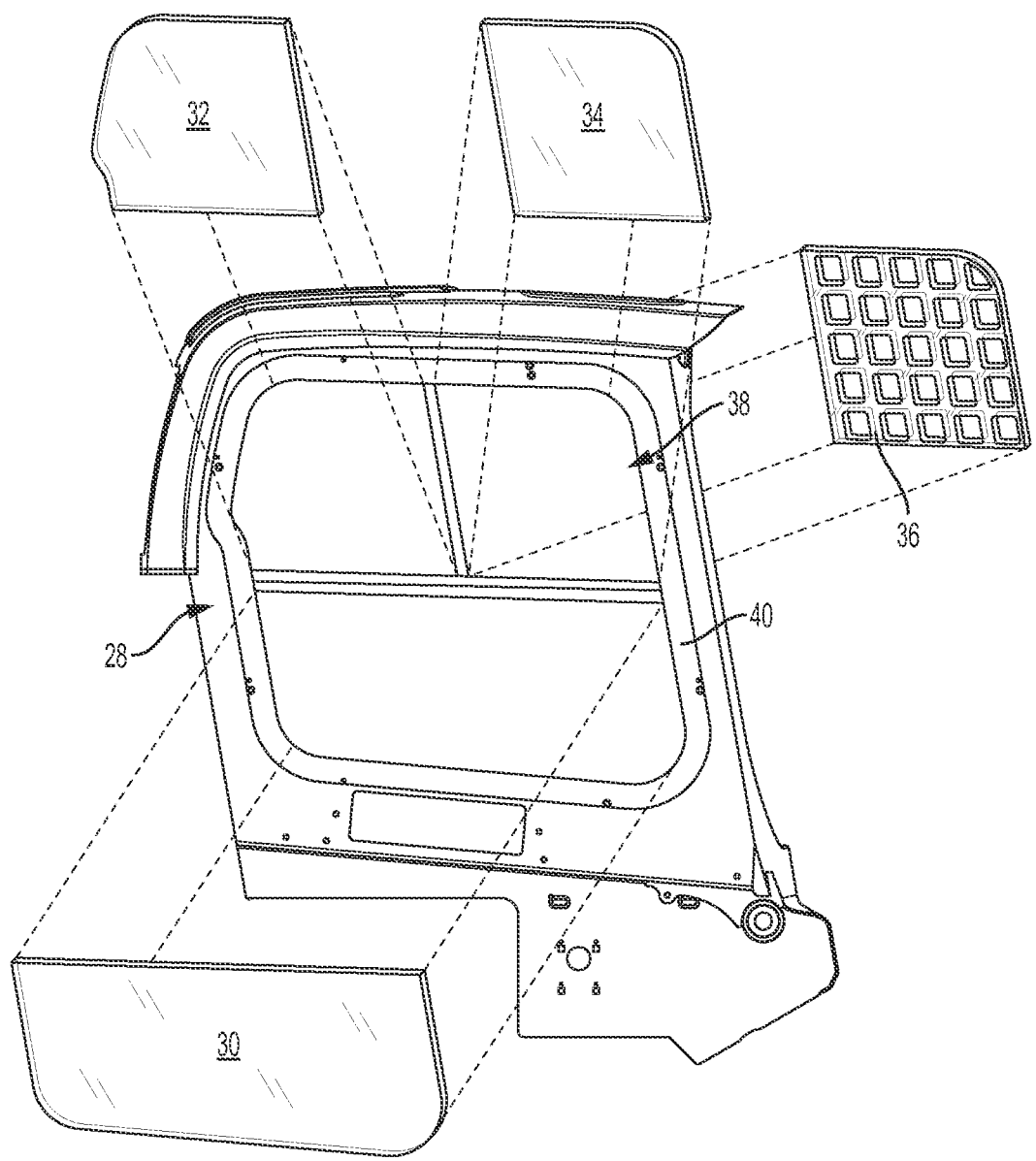
FIG. 4 is an exploded side elevation view of the side wall and window of FIG. 1.

Although the window shown in FIGS. 3-5 has three panes or portions and a screen, any combination of the stationary panes and screen could be integrally formed or made. For example, the window shown in FIGS. 3-5 has a separate upper left pane 32, a lower pane 30 and a transparent screen 36 that covers an opening in the window when the movable pane 34 is opened. In FIGS. 3-5, the panes and screen are attached to and held in place by a frame 40. However, the upper left pane 32, lower pane 30 and transparent screen 36 could be integrally formed and be one single piece.

Other window configurations can also be used without defeating the spirit of the invention. For example, in FIG. 6, a window 28' is shown with four panes, 32, 34, 42, 44. In the window 28' shown in FIG. 6, the, upper left 32 and lower right 42 panes are stationary, while the upper right 34 and lower left 44 panes may be selectively opened and closed. The window 28' shown in FIG. 6 also has a first and second transparent screen 36, 46. The transparent screens 36, 46 prevent the operator in the cab from being able to put his or her arm, or any other object larger than the openings in the screens, through the open area, opening or hole of the window when the upper right 34 and/or lower left 44 panes are slid back, without impairing the operator's vision. In the embodiment shown in FIG. 6, the upper right pane 34 and opening are shown forward of the upper left stationary pane 32 when the upper right window is closed and the lower left pane 44 and opening are shown rearward of the lower right stationary pane 42 when the lower left pane is closed.

Figure 6:
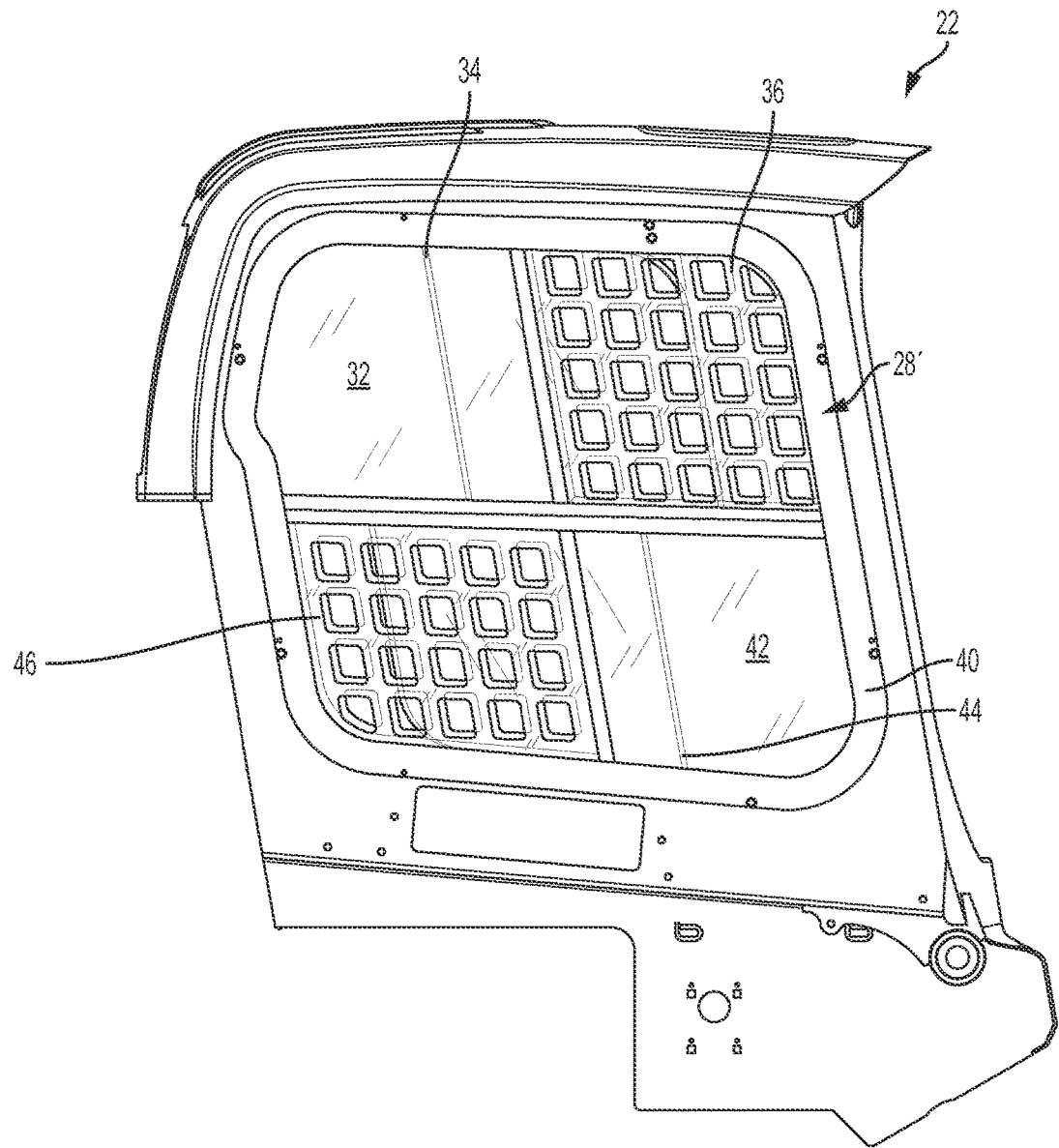
FIG. 6 is a side elevation view of a side wall and an alternative embodiment of a window with two panes in a partially opened position.
Figure 7:
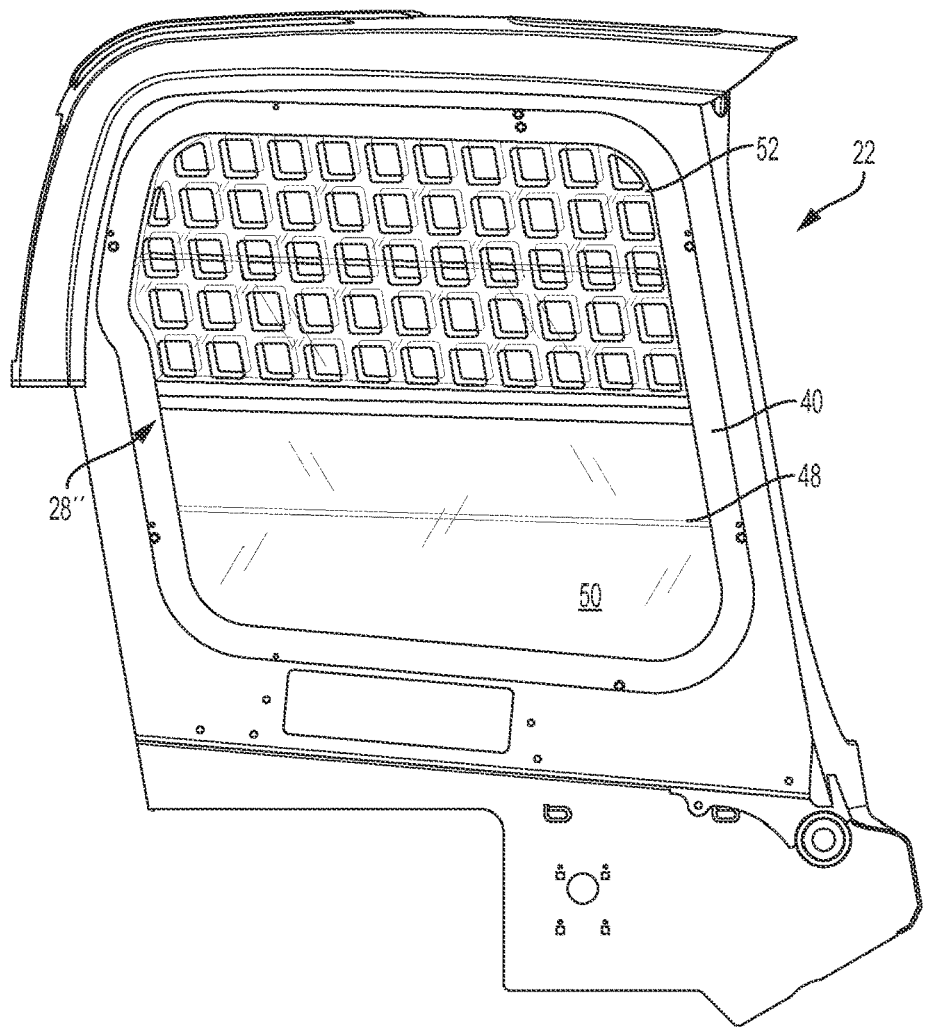
FIG. 7 is a side elevation view of a side wall and an alternative embodiment of a window with a pane in a partially opened position.

The upper right 34 and lower left 44 panes are shown in FIG. 6 as partially opened and partially slid back behind the upper left 32 and lower right 42 panes. However, the upper right 34 and lower left 44 panes could be slid in front of the upper left 32 and lower right 42 panes or could be openable by other means, such as swinging open on hinges, being removed, etc. Further, the operable panes could be slid up and down or vertically rather than back and forth or horizontally.

In any configuration, a transparent screen covers the operable panes of the window, or, more precisely, the space vacated by an operable pane. The transparent screen(s) could additionally cover more than one operable pane. For example, a transparent screen 36 could cover both the upper and lower operable panes if the operable panes were on the same side of the window 28, e.g. both on the top side or both on the left side.

As mentioned above, a window with fewer than three panes could also be employed with departing the spirit of the invention. For example, in FIG. 7, a window 28" with two panes 48, 50 is shown. Either or both of the panes may be operable, but in the example shown in FIG. 7, the upper pane 48, can be slid behind the lower pane 50 to open the window 28". A transparent screen 52 prevents the operator in the cab from direct physical contact with a lift arm, e.g. being able to put his or her arm through the open area of the window, when the upper pane 48 is opened, without impairing the operator's vision. As mentioned above, the window 28" could alternatively be split into a right and left pane without defeating the spirit of the invention.

Figure 8:
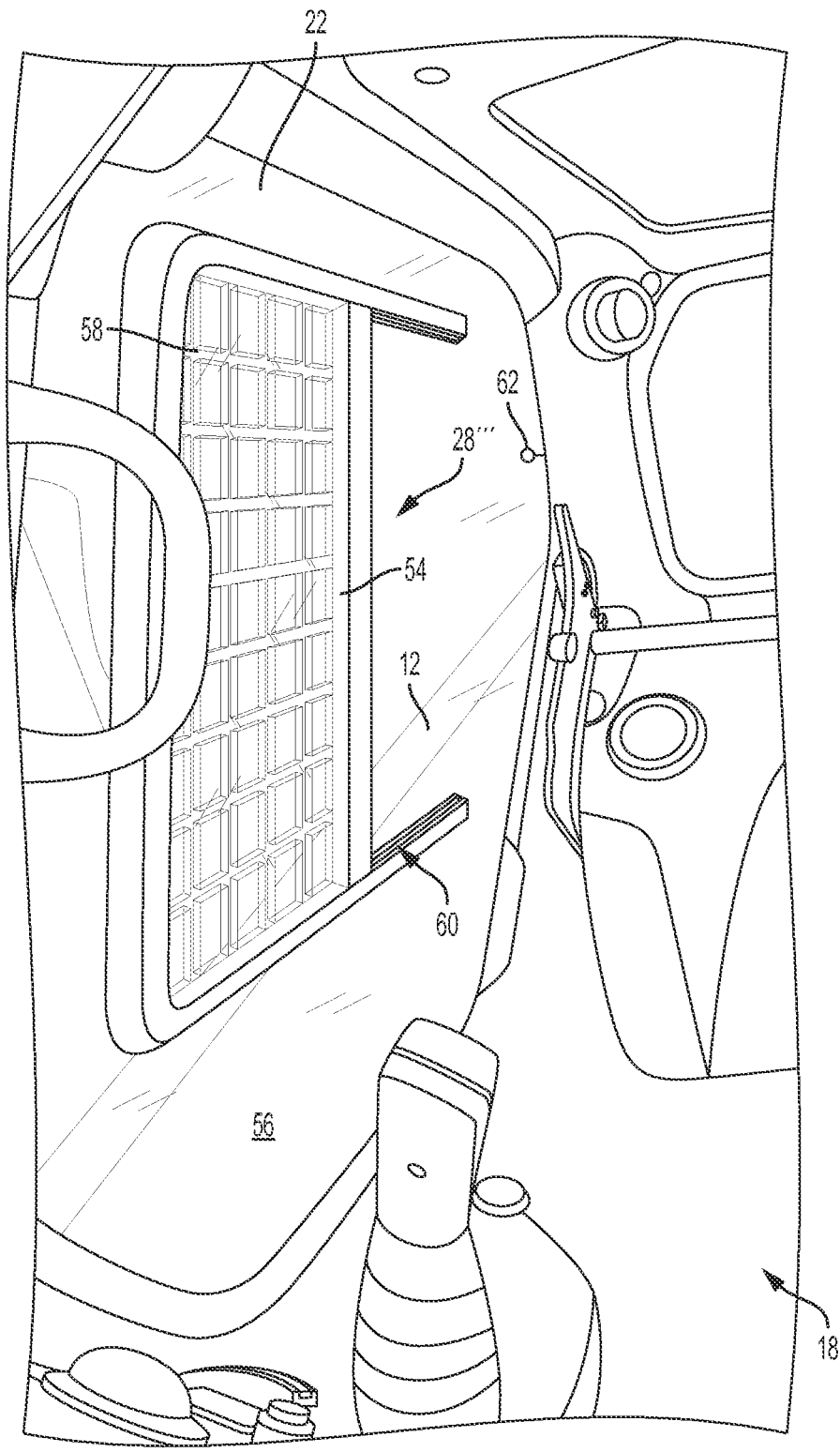
FIG. 8 is a perspective view from inside the cab of a machine of alternative embodiment of a window a one pane in a partially opened position.

By way of another example, FIG. 8 shows a window 28'" with an operable or openable pane 54 located generally in the middle of a larger stationary pane 56. Once again, a transparent screen 58 is located in the open area of the window 28' when the pane 54 is opened. In the embodiment shown in FIG. 8, the openable pane 54 is engaged with and can be slid along a track 60 attached to the larger stationary pane 56 to open and close the window 28'.

The above described examples of windows employing the transparent screen are illustrative only and are not intended to be limiting. There are many other known configurations for windows and manner of opening a window, the use of which would not defeat the spirit of the invention. Further, the window could have a frame, such as that seen in FIGS. 3-7, or be frameless, such as that seen in FIG. 8. The window could also be bolted onto the side panel of the cab.

Figure 9:
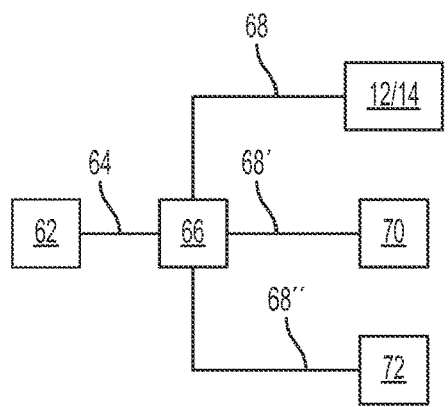
FIG. 9 is a schematic drawing of the sensor signal for a window.

If a glass or polymer is used for the window, it may be advantageous to use one or more sensors to take safety precautions in the event the window breaks or is otherwise compromised. For example, as seen in FIG. 9, if a sensor 62 detects that the glass window has broken, the sensor may send a signal 64 to an electronic control unit 66 in the vehicle which then sends a signal 68, 68', 68" to initiate at least one safety precaution. Such safety precautions can include locking the lift arm(s) 12,14 in order to prevent the operator from extending his or her arm through the broken window and into the path of the lift arm(s), limiting the engine 70 such as by limiting it to an idle or otherwise limiting the revolutions per minute and/or limiting the drive system 72 such as by limiting the speed. Other safety precautions could also be taken, for example, a light and/or noise may turn on or the engine may shut off when a sensor detects that the window has been removed. Numerous types of sensors are currently used to detect breaks in glass as well as if the window is secured in place. For example, strain gauges, light curtains and continuity sensors are just a few examples that could be used in this application.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A window assembly for a cab, the window assembly comprising:
    a transparent pane movable between a first position wherein an interior of the cab for a construction vehicle is not in fluid communication with an exterior of the cab and a second position wherein the interior of the cab is in fluid communication with the exterior of the cab;
    an opening in the window assembly exposed when the at least one transparent pane is in the second position; and
    a lattice made form a clear material covering the opening so as to prevent a person in the cab from gaining access to the exterior of the cab through the opening and to present an unobstructed view through the transparent material of the lattice to a person in a cab.

2. The window assembly of claim 1 wherein the material is a transparent polymer.

3. The window assembly of claim 1 wherein the lattice is made from an injection molded polycarbonate.

4. The window assembly of claim 1 wherein the transparent pane is movable in a horizontal direction.

5. The window assembly of claim 1 wherein the transparent pane is movable in a vertical direction.

6. The window assembly of claim 1 further comprising a stationary transparent pane and wherein the transparent pane is located at least partially behind the stationary transparent pane when the transparent pane is in the second position.

7. The window assembly of claim 6 further comprising a second stationary transparent pane.

8. The window assembly of claim 6 wherein the transparent pane and opening are located generally forward of the stationary transparent pane when the transparent pane is in the first position.

9. The window assembly of claim 6 wherein the transparent pane and opening are located generally rearward of the stationary transparent pane when the transparent pane is in the first position.

10. The window assembly of claim 1 further comprising a stationary transparent pane and wherein the transparent pane and opening are positioned in the stationary transparent pane.

11. A window for a side wall of a cab of a lift arm vehicle, the window comprising:
    a frame for a construction vehicle;
    a grid made from a see-through material and attached to the frame; and
    a see-through portion attached to the frame and moveable between a closed position wherein the see-through portion covers the grid and an open position wherein the grid is at least partially uncovered by the see-through portion;
    wherein the see-through material can be generally seen through so as to provide a generally unimpaired view of an environment outside the cab from inside the cab.

12. The window of claim 11 wherein when the see-through portion is in the open position a first side of the grid is in fluid communication with a second side of the grid.

13. The window of claim 11 wherein when the see-through portion is in the closed position, a first side of the grid is not in fluid communication with a second side of the grid.

14. The window of claim 11 further comprising:
    a second grid made from the see-through material and attached to the frame; and
    a second see-through portion attached to the frame and moveable between a closed position wherein the second see-through portion covers the second grid and an open position wherein the second grid is at least partially uncovered by the second see-through portion.

15. The window of claim 11 wherein the see-through portion is moved by sliding the see-through portion down.

16. The window of claim 11 wherein the material is a material selected from a group consisting of automotive laminated safety glass and a polymer.

17. The window assembly of claim 16 wherein the grid is made from an injection molded polycarbonate.

18. The window of claim 11 further comprising a sensor operably connected to the window to sense if the window is compromised.

19. The window of claim 18 further comprising a stationary see-through portion connected to the frame and wherein the sensor is operably connected to the stationary see-through portion.

20. The window of claim 18 further comprising an electronic control unit, wherein when the electronic control unit receives a signal indicating that the window is compromised, the electronic control unit sends a signal to perform a safety action.

21. The window of claim 19 wherein the safety action performed is selected from a group consisting of locking at least one the lift arm, limiting an engine and limiting a drive system.

22. The window assembly of claim 1 wherein the material is polypropylene.

23. The window assembly of claim 1 wherein the material is thermoplastic polyurethane.

24. The window assembly of claim 1 wherein the material is cellophane.

25. The window assembly of claim 1 wherein the material is acrylic.

26. The window assembly of claim 1 wherein the material is acrylonitrile butadiene styrene.

27. The window assembly of claim 1 wherein the material is automotive laminated safety glass.

28. The window assembly of claim 1 wherein the material is polyethylenimine.

* * * * *